United States Patent
Han et al.

(10) Patent No.: US 8,189,659 B2
(45) Date of Patent: May 29, 2012

(54) CROSS-LAYER OPTIMIZATION FOR SCALABLE VIDEO MULTICAST OVER IEEE 802.11 WIRELESS LOCAL AREA NETWORKS

(75) Inventors: Liqiao Han, Somerset, NJ (US); Hang Liu, Yardley, PA (US); Kumar Ramaswamy, Princeton, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 1079 days.

(21) Appl. No.: 11/990,294

(22) PCT Filed: Aug. 30, 2005

(86) PCT No.: PCT/US2005/030756
§ 371 (c)(1),
(2), (4) Date: Feb. 11, 2008

(87) PCT Pub. No.: WO2007/073362
PCT Pub. Date: Jun. 28, 2007

(65) Prior Publication Data
US 2009/0219990 A1 Sep. 3, 2009

(51) Int. Cl.
*H04N 7/12* (2006.01)
(52) U.S. Cl. .................................. 375/240.02
(58) Field of Classification Search ............. 375/240.27, 375/240.26, 240.01; 370/252, 474, 469; 455/12.1; 709/217
See application file for complete search history.

(56) References Cited

U.S. PATENT DOCUMENTS

| | | | |
|---|---|---|---|
| 6,202,088 B1* | 3/2001 | Corrigan et al. | 709/217 |
| 6,233,253 B1* | 5/2001 | Settle et al. | 370/474 |
| 6,654,384 B1 | 11/2003 | Reza et al. | |
| 6,745,364 B2 | 6/2004 | Bhatt et al. | |
| 2002/0080802 A1* | 6/2002 | Sachs et al. | 370/401 |
| 2004/0127158 A1* | 7/2004 | Dai et al. | 455/12.1 |
| 2005/0249240 A1* | 11/2005 | Boyce et al. | 370/469 |
| 2006/0039482 A1* | 2/2006 | Cho | 375/240.26 |
| 2006/0104346 A1* | 5/2006 | Li et al. | 375/240.01 |
| 2009/0225693 A1* | 9/2009 | Yi et al. | 370/312 |
| 2010/0104025 A1* | 4/2010 | Rose et al. | 375/240.27 |
| 2010/0110905 A1* | 5/2010 | An et al. | 370/252 |

FOREIGN PATENT DOCUMENTS

| | | |
|---|---|---|
| JP | 2001045098 | 2/2001 |
| JP | 2002217948 | 8/2002 |
| JP | 2003092564 | 3/2003 |
| JP | 2003519959 | 6/2003 |
| WO | WO2005041516 | 5/2005 |

OTHER PUBLICATIONS

Han, L. et al.: "Cross layer optimization for scalable video multicast over 802.11 WLANs," Jan. 8, 2006, pp. 838-843, XP010893294.

(Continued)

*Primary Examiner* — Steven H Nguyen
*Assistant Examiner* — Syed M Bokhari
(74) *Attorney, Agent, or Firm* — Robert D. Shedd; Jeffrey M. Navon; Catherine A. Cooper

(57) ABSTRACT

A system and method for transmitting video signals to a plurality of receivers in a multicast session, including controlling and adapting coding, transmission and protection schemes of a plurality of layers of a network protocol stack are described.

33 Claims, 6 Drawing Sheets

OTHER PUBLICATIONS

Majumdar, A. et. al.: "Mulitcast and Unicast Real-Time Video Streaming Over Wireless LANs," vol. 12, No. 6, Jun. 2002, pp. 524-534, XP001114980.

van der Schaar, M. et. al.: "Cross-Layer Wireless Multimedia Transmission: Challenges, Principles, and New Paradigms," vol. 12, No. 4, Aug. 22, 2005, pp. 50-58. XP001235296.

Qian, L. et. al.: "Minimax disappointment criterion for vido broadcasting," vol. 1, Oct. 7, 2001, pp. 449-452, XP010564893.

Video ADHOC Group TELCO: "A Performance Measure for Video Multicast," Thomson, 3GPP TSG System Aspects WG4, Agenda Item: WI Video Codec Performance Requirements, Jun. 15, 2005, pp. 1-4. XP002396341.

Xu, X. et al.: "Fine-granular-scalability video streaming over wireless LANs using cross layer error control," vol. 5, May 17, 2004, pp. 989-992, XP010719097.

van der Schaar et al.: "Adpative Cross-Layer Protection Strategies for Robust Scalable Video Transmission over 802.11 WLANs" vol. 21, No. 10, Dec. 2003, pp. 1752-1763, XP002384185.

Mao, S. et al.: "Multiple Description Video Multicast in Wireless Ad Hoc Networks," Oct. 25, 2004, pp. 671-680, XP010750347.

\* cited by examiner ized. It is not straightforward to
CROSS-LAYER OPTIMIZATION FOR SCALABLE VIDEO MULTICAST OVER IEEE 802.11 WIRELESS LOCAL AREA NETWORKS This application claims the benefit, under 35 U.S.C. §365 of International Application PCT/US2005/030756, filed Aug. 30, 2005, which was published in accordance with PCT Article 21(2) on Jun. 28, 2007 in English.

FIELD OF THE INVENTION

The present invention relates to video content that is multicast over wireless local area networks (WLANs) and more specifically to the improvement of video quality by optimizing distribution for targeted users by adjusting error control strategies across multiple layers of the protocol stack.

BACKGROUND OF THE INVENTION

Video multicast over IEEE 802.11 wireless local area networks (WLANs) enables the distribution of live or pre-recorded video to multiple receivers efficiently, for example, the distribution of TV programs or location specific video information in hotspots such as airport, café, hotel and shopping mall, etc. Users can watch their favorite TV programs on mobile devices while browsing the Internet. Other examples include extension of satellite TV services to mobile devices in tunnels and subways using WLANs, wireless video classes and video training for enterprise users, etc.

The error rate is usually high in wireless networks. For multicast, the IEEE 802.11 wireless link layer does not perform retransmission of lost packets. The data frames are discarded at the receiver in the event of an error. The required reliability cannot, therefore, be guaranteed to the users without excellent receiving conditions. Furthermore, in a video multicast application, the receivers for the same video may experience different channel conditions and the channel condition for a receiver varies at different times due to fading, shadowing, interference and mobility. New receivers may join during the session or some receivers may leave resulting in a changed user topology.

It is known in the art, that to achieve reliable video transmission in wireless local area networks (WLANs), each network protocol layer provides an individual solution, for example, selection of appropriate physical layer modulation and channel coding (PHY mode), media access control (MAC) layer retransmission, application layer forward error correction (FEC), packet size optimization, usage of scalable video coding, etc. However, the mechanisms at each layer operate independently and their parameters are chosen independently. This layered approach does not yield an optimal system performance for video delivery.

Recently, cross-layer design to achieve optimal system performance for video transport in WLANs has attracted some attentions. A cross-layer protection strategy for video unicast in WLANs was proposed by jointly adapting MAC retransmission limit, application layer FEC, packetization and scalable video coding. This strategy is, however, not applicable to multicast. First, for multicast, multiple users receive the same video and the overall video quality of all the users must be considered for optimizing system design. It should be noted that the receivers of the same video may experience different channel conditions at the same time and the same receiver may also experience different channel conditions at different times. Receivers may join or leave during the session so that the receiver topology changes dynamically. Adaptation decisions cannot be made based on a single user's feedback as in the prior art. Second, the IEEE 802.11 link layer does not perform retransmission of lost multicast data frames. The frames are discarded at the receiving MAC in the event of errors. Third, in the prior art, the PHY mode was fixed. The PHY mode is an important parameter impacting the video transmission quality, especially in the case of multicast (no per user link adaptation and retransmission) and the PHY mode, thus, needs to be taken into account for cross-layer optimization. Fourth, in the prior art the bandwidth allocation is optimized. It is not straightforward to optimize the bandwidth allocation when the channel bandwidth is adjustable for different PHY modes. Instead the channel usage needs to be viewed as a more general resource.

The problem to be solved in this invention is how to provide quality of services for all the users of the same multicast video in the desired/target service area while efficiently utilizing available wireless network resources. Therefore, new cross layer optimization algorithms are necessary to provide efficient and robust video multicast services over IEEE 802.11 WLANs in order to provide quality of services for all the users of the same multicast video in the desired/target service area while efficiently utilizing available wireless network resources.

SUMMARY OF THE INVENTION

The present invention is based on an adaptive cross layer optimization method and system for scalable video multicast in IEEE 802.11 WLANs. The present invention, therefore, controls and adapts the various coding, transmission and protection mechanisms available in different network protocol layers, including modulation and channel coding mode in physical layer (PHY mode), application layer forward error correction (FEC) overhead, packetization, and scalable video coding rate, to achieve the optimal overall video quality of all the receivers of the multicast video session in the desired/target service area. Furthermore, different cross-layer transmission and protection parameters are applied to a base layer and an enhancement layer of the scalable video according to the importance of the layers (base and enhancement). The method and system of the present invention are capable of dynamically adapting to the varying user topology and channel conditions of multiple users.

A system and method for transmitting video signals to a plurality of receivers in a multicast session, including controlling and adapting coding, transmission and protection schemes of a plurality of layers of a network protocol stack are described. The system and method of the present invention achieve optimal overall video quality for receivers in a multicast session in a target service area.

BRIEF DESCRIPTION OF THE DRAWINGS

The present invention is best understood from the following detailed description when read in conjunction with the accompanying drawings. The drawings include the following figures briefly described below where like-numbers on the figures represent similar elements.

DETAILED DESCRIPTION OF THE PREFERRED EMBODIMENTS

Figure 1:
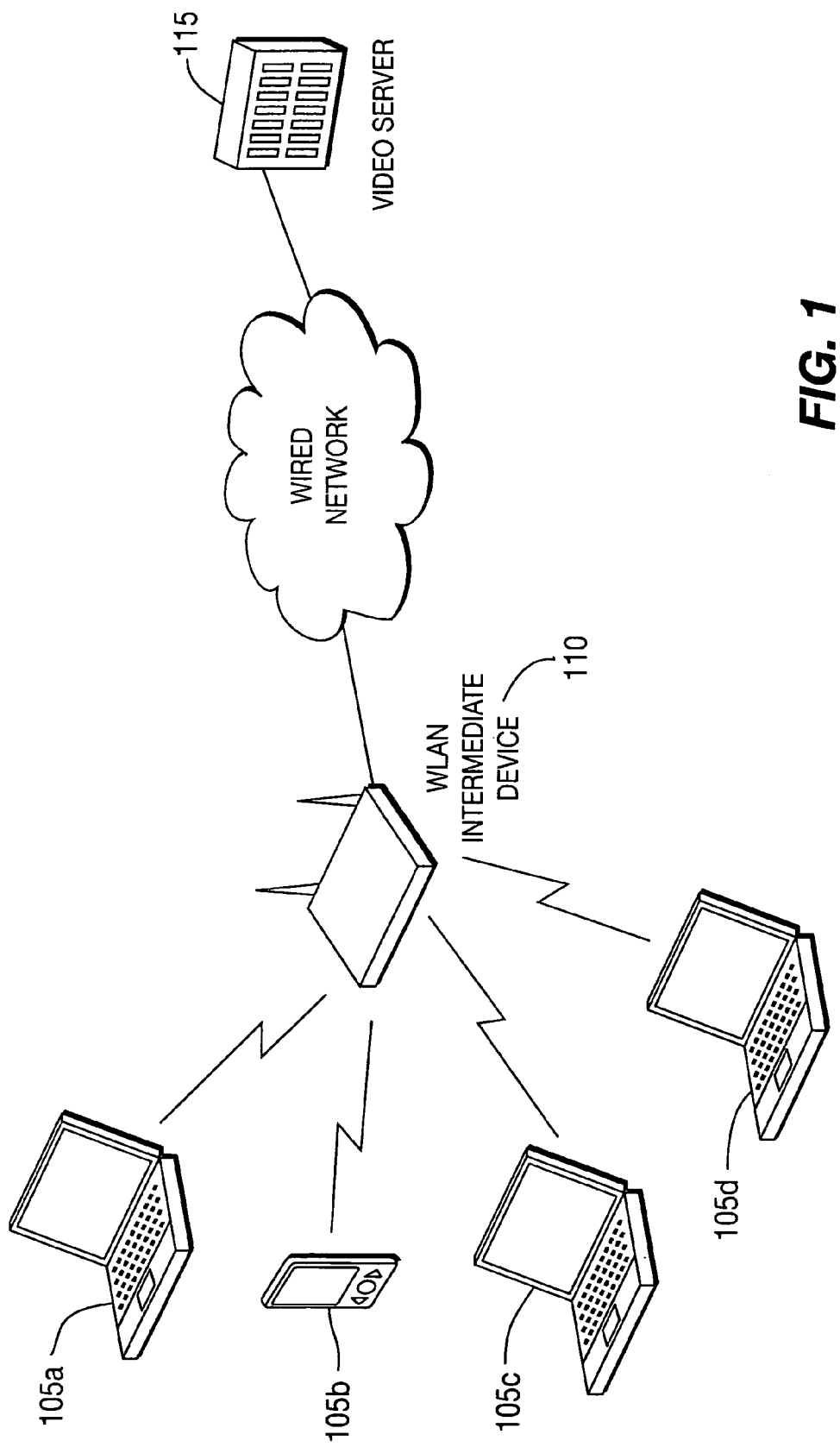
FIG. 1 is an overview diagram of a network system.

Referring now to FIG. 1, a typical network system considered in the context of the present invention is shown. The wireless devices 105a, 105b, 105c, 105d are connected to a video multicast server through IEEE 802.11 wireless intermediate devices 110 (such as wireless access points or wireless routers) and a high-speed wired access network (e.g. Ethernet). Wireless devices include wireless mobile devices such as, but not limited to, mobile phones, cell phones, personal digital assistants (PDAs), laptops, mobile terminals and any other wireless devices that are or can be mobile/wireless. The video server 115 transmits one or more video programs in multicast over the high-speed wired network to the wireless intermediate devices 110. The intermediate devices distribute the video to the wireless devices in multicast over the IEEE 802.11 wireless local area networks (WLANs). The users of the wireless devices 105a-105d can view one or more video programs. The network topology depicted in FIG. 1 is exemplary only and not intended to be limiting. It is used to put the cross-layer optimization method and system of the present invention in the proper context. The cross-layer optimization method and system described herein can be used in video multicast applications over any IEEE 802.11 wireless local area networks with different network configurations.

Video server 115 includes a scalable video encoder, a packetizer, and a forward error correct (FEC) encoder. Fine-grained-scalability (FGS) is used as an example of scalable video to describe the present invention. The present invention can, however, be applied to other scalable video coding. Raw video is encoded into base layer (BL) and enhancement layer (EL) by the video encoder. The base layer (BL) carries the most important video information and the enhancement layer (EL) carries less important information. Each layer of video is packetized and the FEC code is used across the video packets to protect against loss of packets. FEC used can be any systematic forward error correction code, for example, Reed-Solomon (RS) codes. An (n, k) RS code is applied to k source packets to form h=(n−k) FEC protection packets, which can recover (n−k) lost packets. The FEC code rate is defined as r=k/n. The video packets of different layers and their FEC protection packets are sent from the video server to the WLAN intermediate devices (IDs) over a high-speed Ethernet. The WLAN IDs then encapsulate the multicast IP packets in IEEE 802.11 multicast MAC frames and transmit the MAC frames to the users.

To efficiently utilize the network resources such as a WLAN channel, the video source bit rate of BL and EL, the cross-layer transmission and protection schemes (PHY mode and application layer FEC) as well as the packet size are jointly controlled to achieve the optimal overall video quality for all the users of the multicast video in the desired/target service area. These parameters are dynamically adapted to the varying user topology and channel conditions of multiple users based on the channel status feedback from the receivers. Furthermore the base layer and enhancement layer are protected and transmitted differently according to their importance, that is, the cross-layer operating parameters in terms of PHY mode, packet size, and application layer FEC are different for BL and EL.

In the method and system of the present invention, the PHY mode is adapted. The available bandwidth for a video session changes with different PHY modes even if the time that the WLAN channel is used to transmit the video data is the same. Therefore, the channel usage (not the bandwidth) to stream the multicast video is considered to be the constraint. The channel usage of a video session is defined as the percentage of WLAN channel time used to transmit the data of a multicast video session.

In video multicast, receivers experience different channel conditions, then different video quality. The cross-layer operating parameters in terms of PHY mode m, packet size La, application layer FEC parameters n and k that maximize the received quality of one user may not be the optimal one for other users. It is desirable to optimize some compound performance metric for all the users of the same video session under the total channel usage constraint. To measure the overall video quality for multiple users of the same video session (called group video quality), a performance metric is defined as, $$Q_g(J_{BL}, R_{s\_BL}, J_{EL}, R_{s_{EL}}) = \Sigma_i w(\gamma^{(i)}) Q_r^{(i)}(\gamma^{(i)}, J_{BL}, R_{s\_BL}, J_{EL}, R_{s\_EL}) \quad (1)$$

where $R_{s\_BL}$ and $R_{s\_EL}$ denote the source bit rates of BL and EL, respectively, $\gamma^{(i)}$ denotes the channel SNR value experienced by the i-th user of the video multicast session, $J_{BL}$ is the set of cross-layer operating parameters for the base layer video, i.e. $(m_{BL}, L_{a,BL}, n_{BL}, k_{BL})$, $J_{EL}$ is the set of cross-layer operating parameters for the enhancement layer $(m_{EL}, L_{a,EL}, n_{EL}, k_{EL})$. $w(\gamma^{(i)})$ is a weight depending on the value of $\gamma^{(i)}$ and satisfying $$\sum_i w(\gamma^{(i)}) = 1 \quad (2)$$

The performance metric is a weighted average of the received video quality by users with different channel conditions, where the weights depend on the user's channel conditions. A possible weight function is $$w(\gamma^{(i)}) = \begin{cases} 1/N & \gamma^{(i)} \geq \gamma_t \\ 0 & \gamma^{(i)} < \gamma_t \end{cases} \quad (3)$$

where N is the total number of users with the value of the channel SNR $\gamma$ greater than or equal to a threshold $\gamma_t$. That means all users with the channel SNR better than $\gamma_t$ are treated equally, others with worse channel conditions are not considered in choosing and adapting the multicast parameters.

In the present invention, the allowed channel usage T of the WLAN is determined by the video quality of service (QoS) requirements and the available network resources. For a given channel usage T, the present invention controls and adapts the BL operation parameters, including the BL source rate $R_{s\_BL}$ and the BL cross-layer protection and transmission quadruplet $J_{BL}=(m_{BL}, L_{a\_BL}, n_{BL}, k_{BL})$, and the EL operation parameters, including the EL source rate $R_{s\_EL}$ and the EL cross-layer protection and transmission quadruplet $J_{EL}=(m_{EL}, L_{a\_EL}, n_{EL}, k_{EL})$ so as to achieve the optimal overall video quality for all the users $Q_g(J_{BL}, R_{s\_BL}, J_{EL}, R_{s\_EL})$ in the target service area. This is can be formulated as a constraint based optimization problem, $$\max_{(J_{BL}, R_{s\_BL}, J_{EL}, R_{s\_EL})} \left\{ Q_g = \sum_i w(\gamma^{(i)}) Q_r^{(i)}\left(\gamma^{(i)}, J_{BL}, R_{s\_BL}, J_{EL}, R_{s\_EL}\right) \right\} \quad (4)$$

such that $$t_{tot}(J_{BL}, R_{s\_BL}, J_{EL}, R_{s\_EL}) = t_{BL}(J_{BL}, R_{s\_BL}) + t_{EL}(J_{EL}, R_{s\_EL}) \leq T$$

Next, how to choose and adapt these cross-layer source coding, transmission and protection parameters is described in detail. In the present invention, the BL is coded at a minimally acceptable quality of video and its source bit rate $R_{s\_BL}$ is determined according to the desired minimal video quality and the spatio-temporal characteristics of video sequence. The enhancement layer improves upon the base layer video, fully utilizing the available channel usage time. Note that the scalable video content can be compressed in real-time or off-line for later distribution.

For the BL, the cross-layer transmission and protection quadruplet $J_{BL}$ is selected to satisfy the required residual packet loss rate (PLR) for the worst-case user in the target service area while minimizing the BL channel usage. The BL residual PLR is kept very small so that a minimum QoS is ensured for the users in the target service area with a channel SNR better than the threshold $\gamma_t$. Let $P_{t\_BL}$ denote the BL residual PLR required by the application QoS, then, $J_{BL}$ is obtained by $$\min_{(J_{BL})} t_{BL}(J_{BL}, R_{s\_BL}) \quad (5)$$

such that $$P_{RS\_BL}(J_{BL}, \gamma_t) \leq P_{t\_BL}$$

This can be done by the service provider/network administrator. Although the BL source rate $R_{s\_BL}$ and the BL transmission and protection parameters $J_{BL} = (m_{BL}, L_{a\_BL}, n_{BL}, k_{BL})$ can be dynamically adapted with the EL source rate $R_{s\_EL}$, and the EL transmission and protection parameters $J_{EL} = (m_{EL}, L_{a\_EL}, n_{EL}, k_{EL})$ during the video session according to equation (4), the BL parameters are determined here according to the worst possible channel condition in the desired serving area by the service provider/network administrator at the session initialization. This is because if the BL parameters are dynamically changed during the session, users may experience dramatic variations in received video quality between the changes, which is not desirable. Therefore, the BL source coding, transmission and protection parameters are selected based on the worst target channel condition at the session initialization and the EL parameters are dynamically changed according to the varying user topology and channel conditions of multiple users during the session. For example, the service provider/network administrator determines the target service area of a wireless intermediate device such as a building. Given a fixed transmit power $S = S_0$ of the wireless intermediate device, the worst channel SNR $\gamma_t$ in the area can be obtained through experiment measurements or analysis. The users with a channel SNR better than $\gamma_t$, their BL residual PLRs are guaranteed to be less than the required value $P_{t_{BL}}$ so that they can have a minimum video quality. When $t_{BL}$ is minimized, $t_{EL}$ is maximized under a fixed total channel usage.

Furthermore, the EL source rate $R_{s\_EL}$ and the EL cross-layer protection and transmission quadruplet $J_{EL} = (m_{EL}, L_{a\_EL}, n_{EL}, k_{EL})$ are selected to optimize the group video quality under the network resource constraints as defined in equation (4). Based on the feedback of multiple receivers, these EL operation parameters are dynamically adapted to the varying user topology and wireless channel conditions of multiple users. Note that if a user is in a very bad channel condition with a channel SNR less than $\gamma_t$, it is not served as the weight function in equation (3) is used.

For FGS video, when the BL residual PLR is very low, the channel distortion of BL for most video sequences remains very small. The received BL video quality depends on the BL source bit rate. Let $Q_0$ denote the BL video quality at a receiver and $R_{r\_EL}$ the effective received data rate of the EL, and $\theta$ the parameter of the rate-distortion model for the video sequence. The group video quality estimation can be simplified as, $$Q_g = Q_0(R_{s\_BL}) + \theta \cdot \sum_i w(\gamma^{(i)}) R_{r\_EL}^{(i)}(\gamma^{(i)}, J_{EL}, R_{s\_EL}) \quad (6)$$

which means that optimizing the group video quality is equivalent to maximizing the weighted average of the effective received EL data rate over all the users in the target service area.

Figure 2:
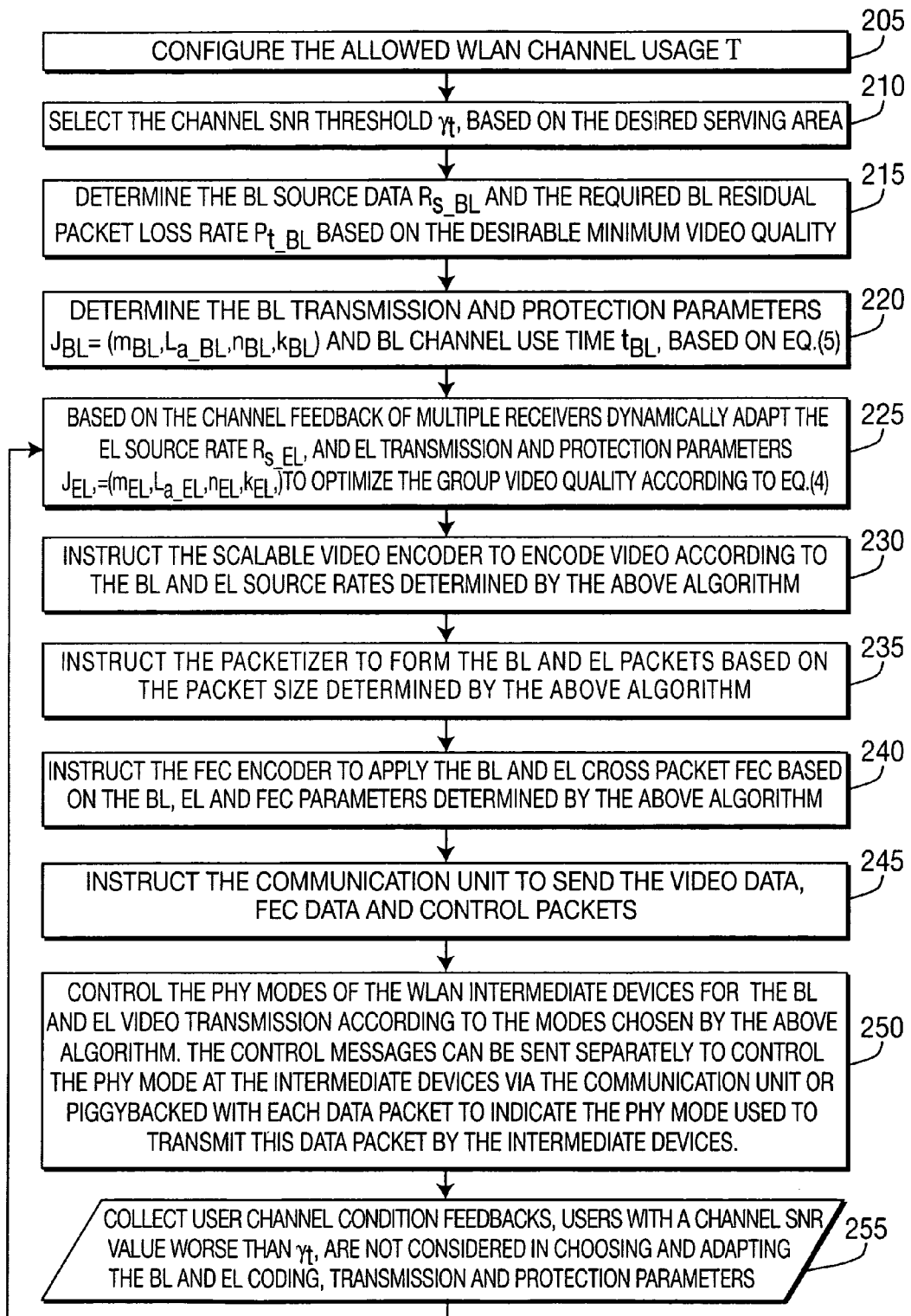
FIG. 2 is a flowchart of the method of the present invention.

Referring to FIG. 2, the run-time optimal cross-layer algorithm of the present invention executed in the cross-layer control module (also called the cross-layer controller) can be summarized as follows. At step 205 the allowed channel usage T of the WLAN is configured according to the video quality of service (QoS) requirements and available network resources. The channel SNR threshold $\gamma_t$ is selected based on the target service area at step 210. The BL source bit rate $R_{s\_BL}$, and the required residual PLR of BL $P_{t\_BL}$ is chosen at step 215 based on the desirable minimum video quality. At step 220, the cross-layer transmission and protection parameters of BL $J_{BL} = (m_{BL}, L_{a\_BL}, n_{BL}, k_{BL})$ to minimize the BL channel usage while guaranteeing the residual PLR is less than the required residual PLR $P_{t\_BL}$ for receivers with a channel SNR better than the SNR threshold $\gamma_t$ (using equation 5) are determined. Users having very bad channel conditions (channel SNR is worse than the threshold) are not considered. The system and method of the present invention dynamically adapt the EL source rate, the cross-layer EL transmission and protection quadruplet $J_{EL} = (m_{EL}, L_{a.EL}, n_{EL}, k_{EL})$ to maximize the group video quality over all the users in the target service area, under the total channel usage constraint (using equation 4) based on varying user topology and channel conditions fed back by multiple receivers (each receiver estimates its channel SNR and sends feedback to the cross-layer controller) at step 225. For FGS video, the cross-layer optimization algorithm of the present invention can be simplified to maximize the weighted average of the effective received EL data rate over all the users in the desired serving area using equation (6) at step 225.

The cross-layer control module instructs the scalable video encoder to encode video based on the BL and EL source rates chosen by the cross-layer control module executing the cross-layer optimization algorithm at step 230. The cross-layer control module also instructs the packetizer to form the BL and EL video packets based on the chosen packet size at step 235 and instructs the FEC encoder to apply the cross packet FEC based on the selected FEC parameters at step 240. The BL and EL video packets and FEC packets are transmitted from the video server to the receivers (wireless devices) via a communication unit at step 245. The cross-layer control module controls and adapts the BL and EL PHY modes (physical layer modulation and channel coding modes) of the WLAN intermediate device based on the modes chosen by the cross-layer optimization algorithm at step 250. The control message can be sent separately to control the PHY mode at the intermediate device via the communication unit or piggybacked with each data packet to indicate the PHY mode used to transmit the data packet by the intermediate device. Furthermore, the cross-layer control module collects the user channel condition feedbacks and based on the channel feedback of multiple receivers dynamically adapts the EL source rate $R_{s\_EL}$, and EL transmission and protection parameters $J_{EL} = (m_{EL}, L_{a,EL}, n_{EL}, k_{EL})$ to optimize the group video quality on the fly at step 255. Note that users with a channel SNR value worse than yr are not considered in choosing and adapting the BL and EL multicast parameters.

Figure 3:
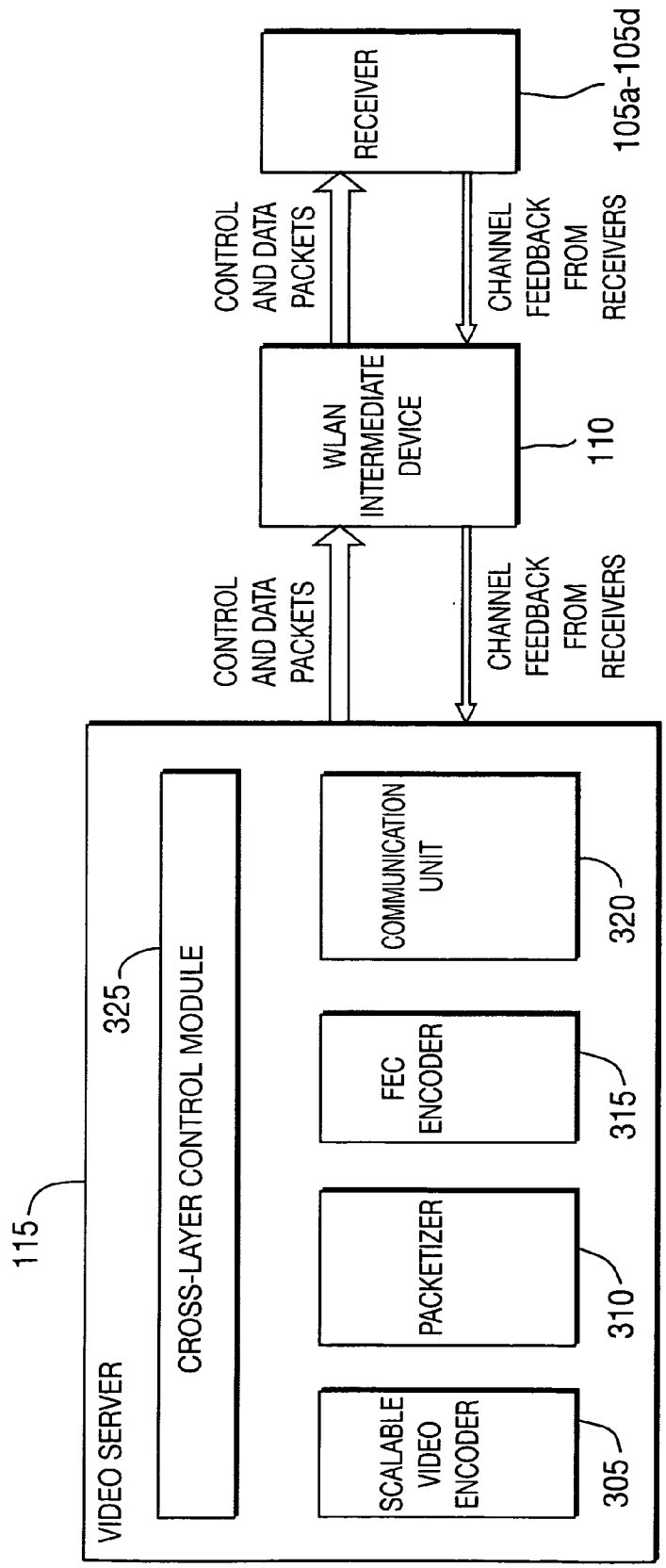
FIG. 3 is a schematic block diagram of a video server in accordance with the present invention.

FIG. 3 is a schematic block diagram of a video server 115 in accordance with the present invention. The video server 115 includes a scalable video encoder 305, a packetizer 310, a forward error correction (FEC) encoder 315, a communication unit 320 and a cross-layer control module 325. The scalable video encoder 305, the packetizer 310, the FEC encoder 315 and the communication unit 320 are all controlled or instructed by the cross-layer control module 325. The scalable video encoder 305 encodes the raw video into base layer and enhancement layer bit stream. The packetizer 310 generates the base layer and enhancement layer packets from the corresponding bit streams and adds packet headers to the generated packets. The FEC encoder 315 applies different cross-packet FEC coding to the base layer and enhancement layer packets. The communications unit 320 sends and receives the packets. The cross-layer control module 325 controls scalable video encoder 305, packetizer 310, forward error correct (FEC) encoder 315 and the communication unit 320 within the video server 115. The cross-layer control module 325 also controls the IEEE 802.11 PHY mode of the wireless intermediate devices (ID) 110 through the communication unit 320 to achieve the optimal overall video quality of multiple users 105a-105d under the required QoS and resource constraints. The control message can be sent separately to configure the ID PHY mode by the cross-layer control module. Alternatively, the control message can be piggybacked with each data packet to indicate which PHY mode should be used to transmit the data packet by the ID. The wireless video receivers would feedback its channel status to the cross-layer control module 325. Based on the estimated channels conditions of multiple receivers 105a-105d of the video session, the cross-layer control module 325 determines and adapts the source bit rate, packet sizes, application layer FEC, and IEEE 802.11 PHY modes for both BL and EL.

In an alternative embodiment, it is possible that the video server 115 and the IEEE 802.11 WLAN intermediate device 110 are co-located. It is also possible to use alternative metrics to measure the group video quality. For example, an alternative metric to minimize the maximum individual video quality degradation due to multicast among the multiple users in the target service area could be employed. If only a single user i in the target service area with a channel SNR of $\gamma^{(i)}$, where $\gamma^{(i)}$ is greater than or equal to the channel SNR threshold $\gamma_t$ is considered, then given the allowed channel usage T, the optimal cross-layer source coding, transmission and protection parameters of BL and EL can be chosen to maximize the video quality of this user. In multicast/broadcast, the receiving quality of the users may be degraded from its optimal performance to a certain extent because other users with different channel conditions also need to be served. The EL source coding, transmission and protection parameters can be chosen to minimize the maximum performance degradation that any user in the serving area suffers. It can be formulated as $$\min \Delta = \min \left\{ \max_{i: \gamma^{(i)} \geq \gamma_t} \left[ Q_{opt}^{(i)}(\gamma^{(i)}) - Q^{(i)} \left( \begin{array}{c} \gamma^{(i)}, J_{BL}, R_{s\_BL}, \\ J_{EL}, R_{s\_EL} \end{array} \right) \right] \right\} \quad (7)$$

where $Q_{opt}^{(i)}(\gamma^{(i)})$ is the best expected video quality for the i-th user achieved by using the optimal source coding, transmission and protection parameters of BL and EL when it is the only user, and $Q^{(i)}$ is its actually received performance for the particular parameters used in multicast. Note that if a user is outside the desired serving area with very bad channel conditions, i.e. $\gamma > \gamma_t$, it is not considered in choosing the multicast parameters. This metric is called the limited minimax metric. An alternative embodiment is to use this metric to determine the EL source coding, transmission and protection parameters.

Figure 4:
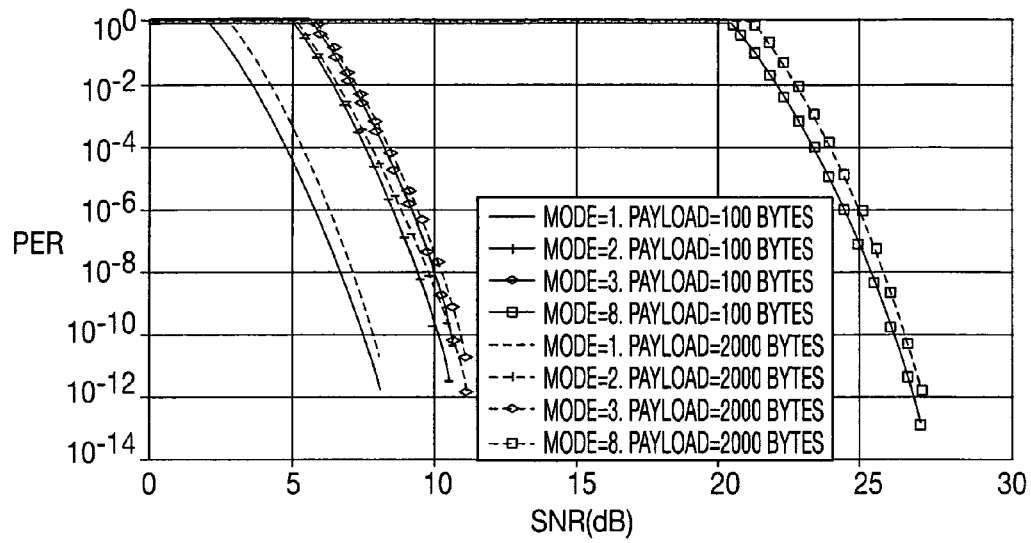
FIG. 4 is a simulation of the packet loss rate for different IEEE 802.11a PHY modes.

FIG. 4 is a simulation of the PLR for two different payload sizes under four IEEE 802.11a PHY modes. When the channel SNR improves, the difference between different payload sizes becomes less. For a given channel SNR, the PLR with a lower date rate mode is always better than that with a higher data rate mode, i.e. the lower data rate the PHY mode has, the more robust it is. This is because the low rate mode uses a more robust modulation scheme and more channel coding overhead.

Figure 5:
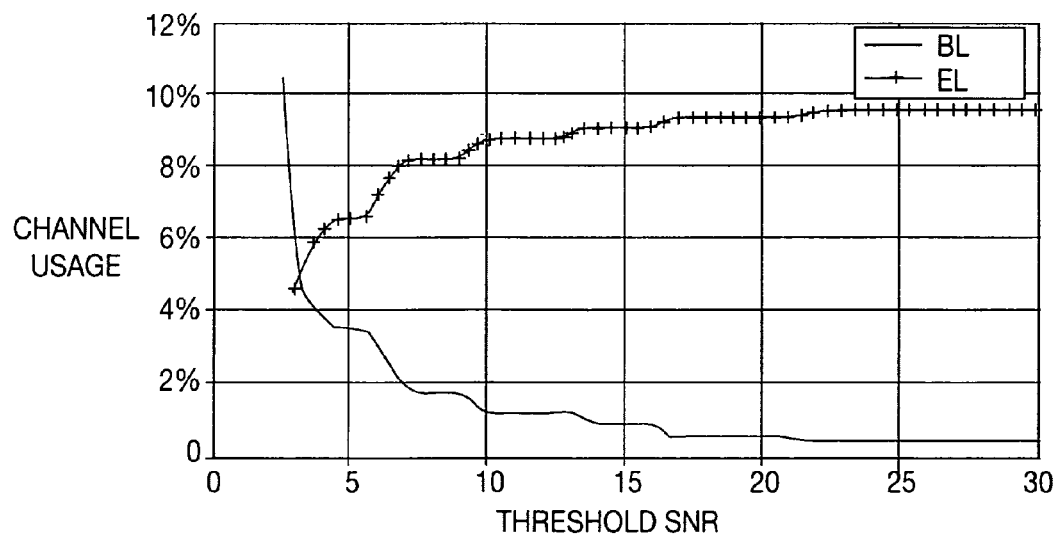
FIG. 5 is a simulation of the channel usage for video base layer and enhancement layer.

The channel SNR threshold $\gamma_t$, is determined by the target service area. The minimum channel usage of BL achieved by the algorithm of the present invention depends on the channel SNR threshold, the required BL residual PLR, and the BL source rate. FIG. 5 is a simulation of the minimum BL channel usage and the channel time left for transmitting EL data under deferent $\gamma_t$ when the BL data rate is 200 Kbps and the total channel usage time $t_{tot}$ allocated for the multicast video session is 10% of a WLAN channel. It can be seen that the BL channel usage steps down with larger channel SNR thresholds. Those knees are because the optimum mode steps up with increasing threshold SNR. When $\gamma_t$ is less than 2.5 dB, the BL channel usage exceeds the $t_{tot}$, the BL video quality cannot be satisfied.

The cross-layer optimization algorithm of the present invention was simulated. In the simulation, the total channel usage time for the video multicast session $t_{tot}$ is fixed to 10%, BL data rate is 200 Kbps with 25 frames per second. It is assumed for simulation purposes that the multicast video session has 80 users whose channel SNR is uniformly distributed between [0, 30] dB.

Figure 6:
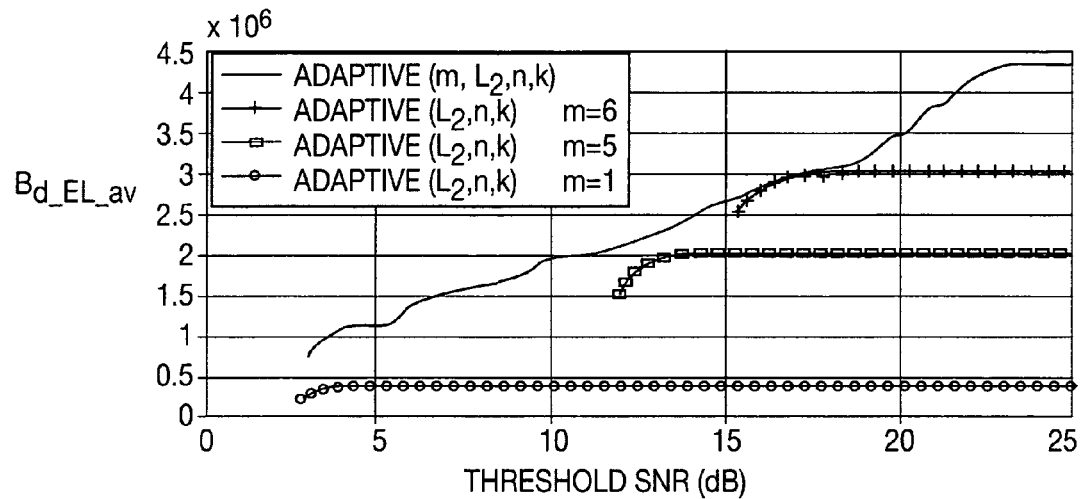
FIG. 6 is a simulation of performance of the cross-layer optimization algorithm of the present invention.
Figure 7:
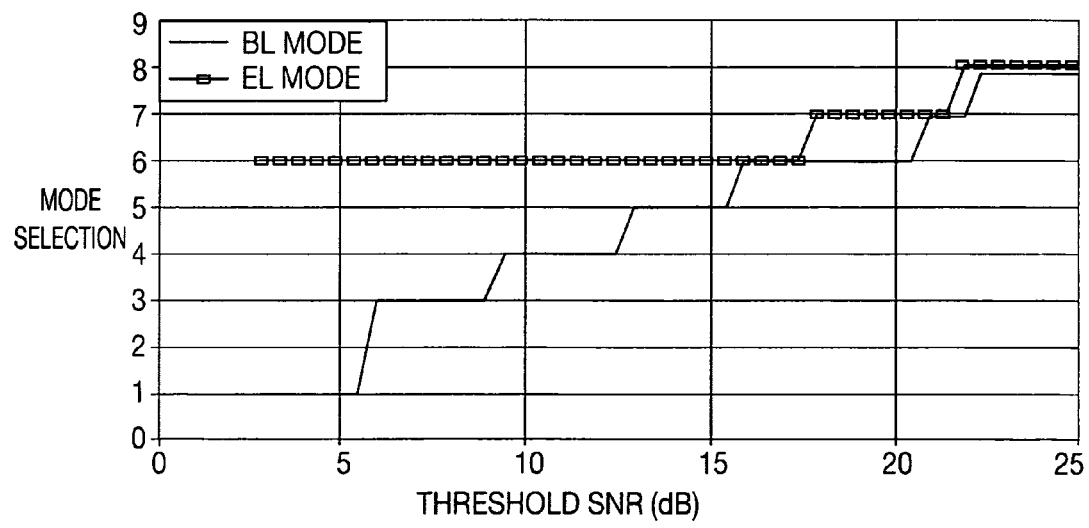
FIG. 7 is a simulation of the base layer and enhancement layer PHY mode selection in the cross-layer optimization algorithm of the present invention.

FIG. 6 is a simulation of the average effective received EL data rate over all the served users $R_{d\_EL\_av}$ using the proposed adaptive cross-layer optimization algorithm to adapt PHY mode, application layer FEC and packet size $J_{EL}=(m_{EL}, L_{a\_EL}, n_{EL}, k_{EL})$ under different channel SNR thresholds $\gamma_t$, which represents the group video quality for FGS video. The weight function used in the simulation is given in equation (3). For comparison, it also shows the results by only adapting application layer FEC and packet size ($L_{a\_EL}, n_{EL}, k_{EL}$) but fixing the PHY mode. Notice that the algorithm of the present invention achieves good performance under different channel SNR thresholds. It can also be seen that it is important to choose the appropriate PHY mode. We notice that with a fixed PHY mode 1 or 5 for both BL and EL video transmission, $R_{d\_EL\_av}$ is always worse than that using the proposed adaptive algorithm. This occurs because modes 5 and 1 are never being selected for EL optimization. FIG. 7 is a simulation of the mode selection for both BL and EL under various SNR thresholds. While the mode for BL steps up gradually with increasing $\gamma_t$, The EL always prefers a higher mode for larger average effective data rate $R_{d\_EL\_av}$.

An alternative weight function may be used to design the system, for example,:

$$w(\gamma^{(i)}) = \begin{cases} 1 & \gamma^{(i)} = \gamma_t \\ 0 & \text{otherwise} \end{cases} \quad (3a)$$

Figure 8:
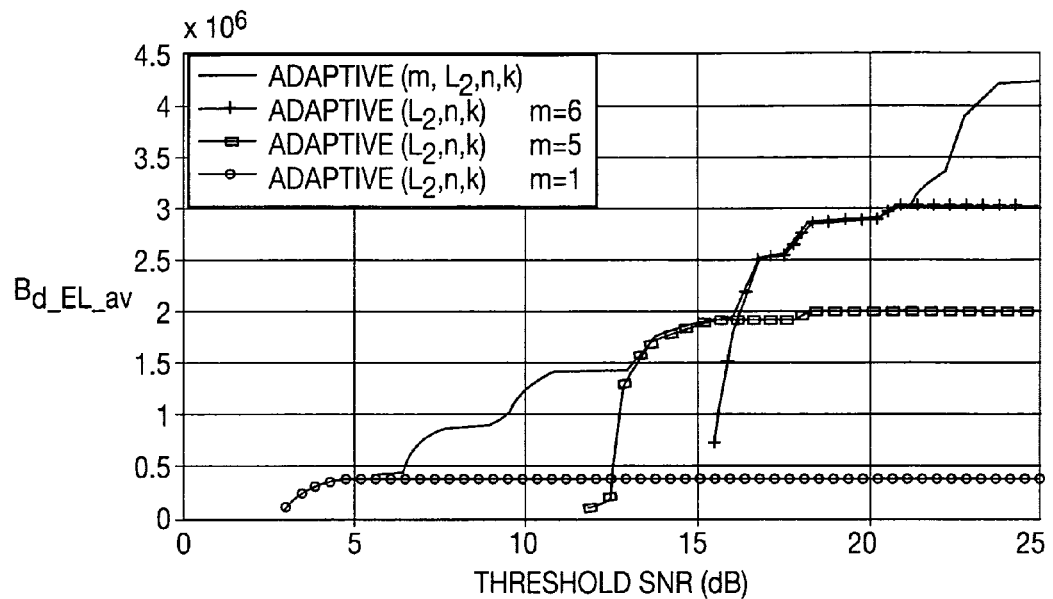
FIG. 8 is a simulation of the performance when the enhancement layer source coding, transmission and protection parameters are selected according to the worst possible channel conditions in the service area.

It is assumed in this case, that there is always a dummy user with a channel SNR equal to $\gamma_t$, the worst possible channel condition in the desired serving area. Thus, the EL source coding, transmission and protection parameters are selected to maximize the video quality of the user with the worst possible channel condition in the serving area. Note that if a user is outside the desired serving area, i.e. $\gamma > \gamma_t$, it would not be considered. FIG. 8 is a simulation of the receiver side average effective EL bit rate using the alternative weight function. One can see that the curve steps up and every PHY mode is selected with different threshold SNRs similar to the BL case.

Figure 9:
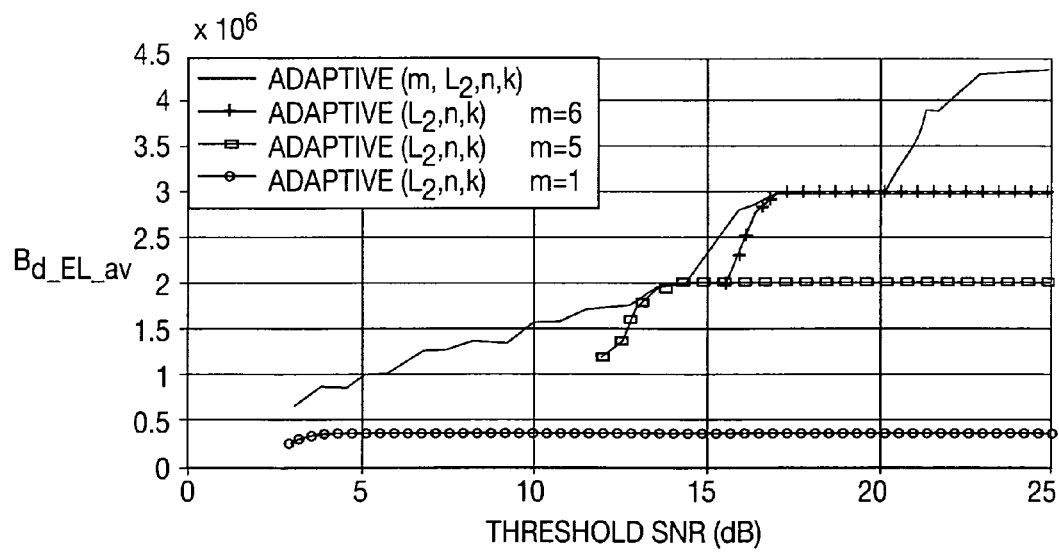
FIG. 9 is a simulation of the performance using a limited minimax metric as the overall video quality metric to determine the enhancement layer source coding, transmission and protection parameters.

FIG. 9 is a simulation of the average effective received EL bit rate using the limited minimax metric as the overall video quality metric. If FIGS. 6-9 are compared, it can be seen that for FIG. 6, the optimization metric does not favor the threshold users. For FIG. 7, the EL source coding, transmission and protection parameters are selected only based on the threshold users. The limited minimax metric for FIG. 9 is to minimize the maximum performance degradation among all users in the serving area. All users will be degraded from their optimal performance to a certain extent and no users are overly penalized. However, one issue with the limited minimax measure is that it is quite complex to compute and system optimization based on it requires intense computation.

It is to be understood that the present invention may be implemented in various forms of hardware (e.g. ASIC chip), software, firmware, special purpose processors, or a combination thereof, for example, within a server, an intermediate device (such as a wireless access point or a wireless router) or mobile device. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for transmitting video signals to a plurality of receivers in a multicast session, said method comprising:
controlling and jointly adapting coding schemes, transmission schemes and protection schemes of a plurality of layers of a network protocol stack, wherein said coding schemes comprise physical layer channel coding modes and wherein said transmission scheme comprise modulation and wherein protection schemes comprise application layer forward error correction coding and packetization;
segmenting said video signals into one of a base layer and an enhancement layer based on importance of said segmented video signals, wherein said segmentation provides unequal protection;
applying forward error correction coding to said base layer and said enhancement layer;
selecting a physical layer modulation and channel coding mode, a packet size and a forward error correction coding scheme for said base layer;
receiving feedback from said plurality of receivers, said feedback including channel conditions; and
dynamically adapting an enhancement layer source rate, an enhancement layer physical layer modulation and channel coding mode and an enhancement layer packet size and applying a forward error correction scheme to said enhancement layer under a total channel usage constraint, said adaptations for said enhancement layer being different from said adaptations for said base layer.

2. The method according to claim 1, further comprising adapting a scalable video coding rate.

3. The method according to claim 1, wherein said plurality of receivers are in a target service area.

4. The method according to claim 1, wherein said packetization includes selecting from a plurality of packet sizes.

5. The method according to claim 1, wherein said receivers are wireless devices.

6. The method according to claim 1, wherein said receivers are mobile devices.

7. The method according to claim 1, further comprising measuring group video quality by using a metric selected from among a plurality of metrics, upon which adaptation of said coding, transmission and protection scheme selection is based.

8. The method according to claim 7, wherein said group video quality metric is a performance metric defined as $$Q_g(J_{BL}, R_{s\_BL}, J_{EL}, R_{s\_EL}) = \Sigma_i w(\gamma^{(i)}) Q_r^{(i)}(\gamma^{(i)}, J_{BL}, R_{s\_BL}, J_{EL}, R_{s\_EL}),$$

where $R_{s\_BL}$ denotes source bit rate of said base layer and $R_{s\_EL}$ denotes said source rate of said enhancement layer, $\gamma^{(i)}$ denotes a channel signal-to-noise ratio value experienced by the i-th user of the multicast session $J_{BL}$ is a set of cross-layer operating parameters for the base layer, $J_{EL}$ is a set of cross-layer operating parameters for the enhancement layer, $w(\gamma^{(i)})$ is a weight depending on the value of $\gamma^{(i)}$ and satisfying $$\sum_i w(\gamma^{(i)}) = 1.$$

$Q_g$ denotes the group quality and $Q_r^{(i)}$ denotes the quality at a receiver of the $i^{th}$ user.

9. the method according to claim 7, wherein said group video quality metric is a limited minimax metric defined as $$\min\Delta = \min\left\{ \max_{i \in \gamma^{(i)} \geq \gamma_t} [Q_{opt}^{(i)}(\gamma^{(i)}) - Q^{(i)}(\gamma^{(i)}, J_{BL}, R_{s\_BL}, J_{EL}, R_{s\_EL})] \right\},$$

where $Q^{(i)}_{opt}(\gamma^{(i)})$ is a best expected video quality for the i-th user achieved by using optimal source coding, transmission and protection parameters of the base layer and the enhancement layer when said $i^{th}$ user is the only user, and $Q^{(i)}$ is its actually received performance for the particular parameters used in multicast.

10. The method according to claim 1, further comprising:
configuring an allowed channel usage T according to video quality of service requirements and available network resources;
selecting a channel signal-to-noise threshold based on a target service area;
selecting a base layer source bit rate and a required residual packet loss rate of said base layer based on a minimum video quality;
determining cross-layer transmission and protection parameters of said base layer to minimize said base layer channel usage while guaranteeing a residual packet loss rate less than a required residual packet loss rate for receivers with a channel signal-to-noise ratio better than a signal-to-noise threshold;

receiving feedback from said plurality of receivers, said feedback including channel conditions;

dynamically adapting the enhancement layer source rate and enhancement transmission and protection parameters to optimize a group video quality metric under the total channel usage constraint based on said feedback;

selecting base layer and enhancement layer source rates;

encoding said video signals based on said base layer and said enhancement layer source rates;

selecting base layer and enhancement layer packet sizes;

forming base layer and enhancement layer video packets based on said selected base layer and enhancement layer packet sizes and generating and adding packet headers to said base layer and enhancement layer video packets;

selecting base layer and enhancement layer cross-packet forward error correction parameters;

applying cross packet forward error correction coding to said base layer and enhancement layer video packets based on said selected base layer and enhancement layer cross-packet forward error correction parameters;

transmitting said base layer and enhancement layer video packets and forward error correction packets to said plurality of receivers;

adapting base layer and said enhancement layer physical layer modulation and channel coding modes of a wireless local area network intermediate device; and dynamically adapting enhancement layer transmission and protection parameters based on said feedback.

11. The method according to claim 10, further comprising sending a control message to said intermediate device to control the physical layer modulation and channel coding mode at said intermediate device.

12. The method according to claim 11, wherein said control message is piggybacked with each data packet.

13. A system for transmitting video signals to a plurality of receivers in a multicast session, comprising:

means for controlling and jointly adapting coding schemes, transmission schemes and protection schemes of a plurality of layers of a network protocol stack, wherein said coding schemes comprise physical layer channel coding modes and wherein said transmission scheme comprise modulation and wherein protection schemes comprise application layer forward error correction coding and packetization;

means for segmenting said video signals into one of a base layer and an enhancement layer based on importance of said segmented video signals, wherein said segmentation provides unequal protection;

means for applying forward error correction coding to said base layer and said enhancement layer;

means for selecting a physical layer modulation and channel coding mode, a packet size and a forward error correction coding scheme for said base layer;

receiving feedback from said plurality of receivers, said feedback including channel conditions; and means for dynamically adapting an enhancement layer source rate, an enhancement layer physical layer modulation and channel coding mode and an enhancement layer packet size and applying a forward error correction scheme to said enhancement layer under a total channel usage constraint, said adaptations for said enhancement layer being different from said adaptations for said base layer.

14. The system according to claim 13, further comprising means for adapting a scalable video coding rate.

15. The system according to claim 13, wherein said plurality of receivers are in a target service area.

16. The system according to claim 13, wherein said means for adapting packetization includes means for selecting from a plurality of packet sizes.

17. The system according to claim 13, wherein said receivers are wireless devices.

18. The system according to claim 13, wherein said receivers are mobile devices.

19. The system according to claim 13, further comprising means for measuring group video quality by using a metric selected from among a plurality of metrics, upon which adaptation of said coding, transmission and protection scheme selection is based.

20. The system according to claim 19, wherein said group video quality metric is a performance metric defined as $$Q_g(J_{BL}, R_{s\_BL}, J_{EL}, R_{s\_EL}) = \Sigma_i w(\gamma^{(i)}) Q_r^{(i)}(\gamma^{(i)}, J_{BL}, R_{s\_BL}, J_{EL}, R_{s\_EL})$$

where $R_{s\_BL}$ denotes source bit rate of said base layer and $R_{s\_BL}$ denotes said source rate of said enhancement layer, $\gamma^{(i)}$ denotes a channel signal-to-noise ratio value experienced by the i-th user of the multicast session, $J_{BL}$ is a set of cross-layer operating parameters for the base layer, $J_{EL}$ is a set of cross-layer operating parameters for the enhancement layer, $w(\gamma^{(i)})$ is a weight depending on the value of $\gamma^{(i)}$ and satisfying $$\sum_i w(\gamma^{(i)}) = 1.$$

$Q_g$ denotes the group quality and $Q_r^{(i)}$ denotes the quality at a receiver of the $i^{th}$ user.

21. the system according to claim 19, wherein said group video quality metric is a limited minimax metric defined as $$\min\Delta = \min\left\{\max_{i \in \gamma^{(i)} \geq \gamma_t}[Q_{opt}^{(i)}(\gamma^{(i)}) - Q^{(i)}(\gamma^{(i)}, J_{BL}, R_{s\_BL}, J_{EL}, R_{s\_EL})]\right\}$$

where $Q^{(i)}_{opt}(\gamma^{(i)})$ is a best expected video quality for the i-th user achieved by using optimal source coding, transmission and protection parameters of the base layer and the enhancement layer when said $i^{th}$ user is the only user, and $Q^{(i)}$ is its actually received performance for the particular parameters used in multicast.

22. The system according to claim 13, further comprising:

means for configuring an allowed channel usage T according to video quality of service requirements and available network resources;

means for selecting a channel signal-to-noise threshold based on a target service area;

means for selecting a base layer source bit rate and a required residual packet loss rate of said base layer based on a minimum video quality;

means for determining cross-layer transmission and protection parameters of said base layer to minimize said base layer channel usage while guaranteeing a residual packet loss rate less than a required residual packet loss rate for receivers with a channel signal-to-noise ratio better than a signal-to-noise threshold;

means for receiving feedback from said plurality of receivers, said feedback including channel conditions;

means for dynamically adapting the enhancement layer source rate and transmission and protection parameters to optimize the a group video quality metric under the total channel usage constraint based on said feedback;

means for selecting base layer and enhancement layer source rates;

means for encoding said video signals based on said base layer and said enhancement layer source rates;

means for selecting base layer and enhancement layer packet sizes;

means for forming base layer and enhancement layer video packets based on said selected base layer and enhancement layer packet sizes and generating and adding packet headers to said base layer and enhancement layer video packets;

means for selecting base layer and enhancement layer cross-packet forward error correction parameters;

means for applying cross packet forward error correction coding to said base layer and enhancement layer video packets based on said selected base layer and enhancement layer forward error correction parameters;

means for transmitting said base layer and enhancement layer video packets and forward error correction packets to said plurality of receivers;

means for adapting base layer and said enhancement layer physical layer modulation and channel coding modes of a wireless local area network intermediate device; and means for dynamically adapting enhancement layer transmission and protection parameters based on said feedback.

23. The system according to claim 22, further comprising means for sending a control message to said intermediate device to control the physical layer modulation and channel coding mode at said intermediate device.

24. The system according to claim 23, wherein said control message is piggybacked with each data packet.

25. The system according to claim 13, further comprising:
a video server including:
 a cross-layer control module;
 a scalable video encoder;
 a packetizer;
 a forward error correction encoder; and
 a communication unit.

26. The system according to claim 25, wherein said cross-layer control module controls said scalable video encoder, said packetizer, said forward error correction encoder and said communication unit and performs the following functions:

configuring an allowed channel usage T according to video quality of service requirements and available network resources;

selecting a channel signal-to-noise threshold based on a target service area;

selecting a base layer source bit rate and a required residual packet loss rate of said base layer based on a minimum video quality;

determining cross-layer transmission and protection parameters of said base layer to minimize said base layer channel usage while guaranteeing a residual packet loss rate less than a required residual packet loss rate for receivers with a channel signal-to-noise ratio better than a signal-to-noise threshold;

receiving feedback from said plurality of receivers, said feedback including network topology and channel conditions via said communications unit;

dynamically adapting the enhancement layer source rate and transmission and protection parameters to optimize the a group video quality metric under the total channel usage constraint based on said feedback;

selecting base layer and enhancement layer source rates;

selecting base layer and enhancement layer packet sizes;

selecting base layer and enhancement layer cross-packet forward error correction parameters;

adapting said base layer and said enhancement layer physical layer modulation and channel coding modes of a wireless local area network intermediate device; and for dynamically adapting enhancement layer transmission and protection parameters based on said feedback.

27. The system according to claim 25, wherein said scalable video encoder encodes said video signals based on base layer and said enhancement layer source rates.

28. The system according to claim 25, wherein said packetizer forms base layer and enhancement layer video packets based on said selected base layer and enhancement layer packet sizes and adds packet headers.

29. The system according to claim 25, wherein said forward error correction encoder applies cross packet forward error correction coding to said base layer and enhancement layer video packets based on said selected forward error correction parameters.

30. The system according to claim 25, wherein said communication unit transmits said video packets and forward error correction packets to said plurality of receivers.

31. The system according to claim 25, wherein said cross-layer control module controls and adapts said base layer and said enhancement layer physical layer modulation and channel coding modes of a wireless local area network intermediate device based on said selected modes.

32. The system according to claim 31, wherein a control message is sent to said intermediate device of said wireless local area network to control said physical layer modulation and channel coding mode via said communication unit.

33. The system according to claim 32, wherein a control message is sent to said intermediate device of said wireless local area network to control said physical layer modulation and channel coding mode via said communication unit by piggybacking said control message on each data packet transmitted.

* * * * *